(12) United States Patent
Sansone et al.

(10) Patent No.: US 7,506,615 B1
(45) Date of Patent: Mar. 24, 2009

(54) ANIMAL WASTE COLLECTION AND DISPOSAL SYSTEM

(75) Inventors: Mary M. Sansone, Orchard Park, NY (US); Michael A. Sansone, Orchard Park, NY (US)

(73) Assignee: Mar Mar PS Development Co., LLC, Orchard Park, NY (US)

( * ) Notice: Subject to any disclaimer, the term of this patent is extended or adjusted under 35 U.S.C. 154(b) by 0 days.

(21) Appl. No.: 10/906,127

(22) Filed: Feb. 3, 2005

(51) Int. Cl.
*A01K 23/02* (2006.01)
*A01K 29/00* (2006.01)

(52) U.S. Cl. ................. 119/867; 119/161; 119/795; 294/1.3; 294/3

(58) Field of Classification Search ............ 119/161, 119/867, 868, 806, 795–798, 792; D30/153, D30/161, 162; 294/1.3, 1.5, 1.4, 3, 55, 53.5
See application file for complete search history.

(56) References Cited

U.S. PATENT DOCUMENTS

| | | | |
|---|---|---|---|
| 2,437,628 A | 3/1948 | Warren | |
| 3,647,102 A | 3/1972 | Cooley | |
| 3,813,121 A | 5/1974 | Marvin | |
| 3,910,619 A | 10/1975 | Schmieler | |
| 3,935,443 A | 1/1976 | Simmons | |
| 3,947,985 A | 4/1976 | Skrzypczak | |
| 3,964,775 A | 6/1976 | Boyd | |
| 4,037,867 A | 7/1977 | Fano et al. | |
| 4,119,181 A | 10/1978 | Jones | |
| 4,215,887 A | 8/1980 | Boots | |
| 4,350,274 A | 9/1982 | Morgan | |
| 4,519,340 A | 5/1985 | Dickey | |
| 4,878,703 A | 11/1989 | Yoshioka | |
| 4,957,063 A * | 9/1990 | Heitfeld et al. | 119/172 |
| 5,134,974 A | 8/1992 | Houser | |
| 5,149,159 A | 9/1992 | Bardes | |
| D330,786 S | 11/1992 | Edgar | |
| 5,178,426 A | 1/1993 | David et al. | |
| 5,178,469 A | 1/1993 | Collinson | |
| 5,186,506 A * | 2/1993 | Gale | 294/1.3 |
| 5,265,719 A * | 11/1993 | Wand | 206/223 |
| 5,358,295 A | 10/1994 | Campbell | |
| 5,370,431 A | 12/1994 | Henninger et al. | |
| 5,385,376 A | 1/1995 | Malaspina et al. | |
| 5,409,279 A | 4/1995 | Magee | |
| 5,429,075 A | 7/1995 | Passarella et al. | |
| 5,438,708 A | 8/1995 | Jacovitz | |
| 5,441,017 A | 8/1995 | Lindsay | |
| 5,447,227 A * | 9/1995 | Kosberg | 206/233 |
| 5,476,296 A | 12/1995 | Gross | |
| D369,007 S | 4/1996 | Jones | |
| 5,511,682 A | 4/1996 | Pace | |

(Continued)

FOREIGN PATENT DOCUMENTS

AU          683409 B    * 11/1997

(Continued)

*Primary Examiner*—Andrea M Valenti
(74) *Attorney, Agent, or Firm*—Simpson & Simpson, PLLC (57) ABSTRACT

An animal waste collection and disposal system having a portable carrying housing with a plurality of separately sealable compartments, an integral ergonomic handle and integral apparatus to mount a leash. The collection and disposal system includes an animal waste collection tongs device having an integral protective shield, and also includes a waste disposal device having a biodegradable bag and a catalyst pouch integral to the bag.

13 Claims, 7 Drawing Sheets

U.S. PATENT DOCUMENTS

| | | | |
|---|---|---|---|
| 5,540,351 A | 7/1996 | Luescher | |
| 5,540,469 A * | 7/1996 | Albert | 294/1.4 |
| 5,540,470 A | 7/1996 | Lu | |
| 5,551,569 A * | 9/1996 | Garvin-Mazzarisi | 206/554 |
| 5,558,044 A | 9/1996 | Masser, Jr. et al. | |
| 5,560,321 A | 10/1996 | Hess | |
| 5,564,763 A | 10/1996 | Mercurio | |
| D376,215 S | 12/1996 | Gomm et al. | |
| 5,580,157 A | 12/1996 | Patricca et al. | |
| D377,247 S * | 1/1997 | Albert | D30/162 |
| 5,620,220 A | 4/1997 | Khoshnood | |
| 5,622,261 A | 4/1997 | Mobley et al. | |
| 5,628,537 A | 5/1997 | Kiemer | |
| D379,689 S | 6/1997 | Levine et al. | |
| 5,636,594 A | 6/1997 | Pina | |
| 5,713,616 A | 2/1998 | Knudson | |
| 5,727,500 A | 3/1998 | Conboy | |
| D393,504 S | 4/1998 | Eisman | |
| 5,762,029 A | 6/1998 | DuBois et al. | |
| 5,772,063 A | 6/1998 | Gantz-Bloome | |
| 5,803,293 A | 9/1998 | Lovekin | |
| 5,826,547 A * | 10/1998 | Gajewska | 119/795 |
| D402,426 S | 12/1998 | Levine et al. | |
| D405,565 S * | 2/1999 | Price | D30/162 |
| 5,876,079 A | 3/1999 | Rycroft | |
| 5,887,550 A | 3/1999 | Levine et al. | |
| 5,890,456 A | 4/1999 | Tancrede | |
| 5,895,082 A | 4/1999 | Kaluzny | |
| D410,117 S | 5/1999 | Ball et al. | |
| 5,908,132 A | 6/1999 | Pigeon | |
| 5,967,095 A | 10/1999 | Greves | |
| D416,366 S | 11/1999 | Dunbar | |
| D416,657 S | 11/1999 | Compitello | |
| 5,983,836 A | 11/1999 | Chavez | |
| 6,003,472 A | 12/1999 | Matt et al. | |
| 6,019,067 A | 2/2000 | Carey | |
| 6,024,054 A | 2/2000 | Matt et al. | |
| 6,030,089 A | 2/2000 | Parker et al. | |
| 6,035,809 A | 3/2000 | Fingerett et al. | |
| 6,039,368 A * | 3/2000 | Kowalczyk | 294/1.3 |
| 6,047,843 A | 4/2000 | Mecke | |
| 6,073,590 A | 6/2000 | Polding | |
| 6,085,695 A | 7/2000 | Miller et al. | |
| 6,086,123 A | 7/2000 | Sowinski et al. | |
| 6,129,096 A | 10/2000 | Johnson | |
| 6,131,977 A * | 10/2000 | Sacks et al. | 294/99.2 |
| 6,152,079 A | 11/2000 | Chandler | |
| 6,170,692 B1 | 1/2001 | Johnston | |
| 6,176,388 B1 | 1/2001 | Orndorff | |
| D438,000 S * | 2/2001 | Couchon et al. | D3/231 |
| 6,199,737 B1 | 3/2001 | Ringelstetter | |
| 6,237,533 B1 * | 5/2001 | Rodriguez | 119/161 |
| 6,257,473 B1 | 7/2001 | Ringelstetter | |
| 6,289,849 B1 | 9/2001 | Macedo et al. | |
| 6,314,917 B1 | 11/2001 | Ryan | |
| 6,328,158 B1 | 12/2001 | Bisbal et al. | |
| D453,386 S | 2/2002 | Philipson | |
| D455,880 S | 4/2002 | Nicoud et al. | |
| 6,418,881 B1 | 7/2002 | Starratt | |
| 6,446,903 B1 | 9/2002 | Bazan | |
| 6,571,745 B2 | 6/2003 | Kerrigan | |
| 6,578,730 B2 | 6/2003 | Trunsky | |
| 6,607,226 B1 | 8/2003 | Poncy | |
| 6,611,961 B2 | 9/2003 | Demeur et al. | |
| 6,647,923 B2 | 11/2003 | Nicoud et al. | |
| 6,681,950 B2 | 1/2004 | Miller, Jr. et al. | |
| 2001/0022161 A1 | 9/2001 | Macedo et al. | |
| 2001/0034904 A1 | 11/2001 | Phillips et al. | |
| 2002/0038957 A1 | 4/2002 | Harrison | |
| 2003/0005891 A1 | 1/2003 | Lu | |
| 2003/0017583 A1 | 1/2003 | Mitchell | |
| 2003/0079695 A1 | 5/2003 | Kerrigan | |
| 2003/0101943 A1 | 6/2003 | Nicoud et al. | |
| 2003/0127059 A1 | 7/2003 | Smith, Jr. et al. | |
| 2003/0137157 A1 | 7/2003 | Hopkins | |
| 2003/0154931 A1 | 8/2003 | Ostrowiecki | |
| 2004/0000079 A1 | 1/2004 | Emert | |
| 2004/0000556 A1 | 1/2004 | Harris | |
| 2005/0115520 A1 * | 6/2005 | Mancini | 119/796 |
| 2005/0279290 A1 * | 12/2005 | Hyland | 119/867 |

FOREIGN PATENT DOCUMENTS

| | | | |
|---|---|---|---|
| DE | 3301761 A1 * | 8/1984 | |
| DE | 3604997 A * | 8/1987 | |
| DE | 199 35 221 A1 | 3/2000 | |
| DE | 10042964 A * | 3/2002 | |
| EP | 0 361 117 A2 | 8/1989 | |
| EP | 0 441 082 A1 | 2/1990 | |
| EP | 0 990 600 A1 | 10/1998 | |
| EP | 1 195 469 A1 | 4/2002 | |
| FR | 2 599 953 | 12/1987 | |
| FR | 2 652 338 | 3/1991 | |
| FR | 2 674 058 | 9/1992 | |
| GB | 2 336 101 A | 10/1999 | |
| JP | 11-32612 | 2/1999 | |
| JP | 2002-223655 | 8/2002 | |
| JP | 2003146358 A * | 5/2003 | |
| WO | WO 03/050790 A1 | 6/2003 | |

* cited by examiner

ANIMAL WASTE COLLECTION AND DISPOSAL SYSTEM

FIELD OF THE INVENTION

The present invention relates generally to waste collection systems, more particularly, to an animal waste collection and disposal system, and, more specifically, to an ergonomically designed animal waste collection and disposal system having means to accelerate biodegradation of collected waste.

BACKGROUND

Pet owners are regularly presented with the undesirable task of handling and disposing animal waste. Much like their human counterparts, animals produce waste on a daily basis. It is desirable to dispose of animal waste in an appropriate manner. Quite often, local ordinances require pet owners to properly recover and dispose of the biological waste produced by their animals. Hence, people have long used a variety of devices for collecting and disposing such animal waste.

While the aforementioned issue may at first glance appear trivial, there are several considerations to account for prior to, during and after the collection of animal waste. Animal waste contains bacteria and other microbial material that is harmful to humans. Therefore, it may not be incorporated with other material being decomposed to fertilize edible plants. Additionally, with the increased concern for the environment, municipalities often require proper collection and disposal of animal waste, i.e., segregation from other degradable materials. Hence, many municipalities are segregating waste by its type to facilitate recycling, decomposing and reusing waste material.

Several collection and disposal apparatus are directed at reclaiming waste materials, thereby assisting in accomplishing the above-described tasks. Some devices may only perform a part of the process, such as collecting the waste material. For example, U.S. Pat. No. 3,813,121 (Marvin) teaches a scissor-like waste disposal device having a plastic bag to secure the waste material within the device after its collection. It is taught that the entire assembly is subsequently disposed of in a manner appropriate for the waste contained therein.

Other devices include features that not only facilitate waste recovery, but aid in handling an animal. U.S. Pat. No. 5,540,469 (Albert) discloses an animal waste collecting device having a molded plastic body, in part forming a scoop for the collection of animal waste. A hollow cylindrical handle permits a pet owner to carry a flashlight while using the scoop. Lastly, a retractable leash may be placed within an integral molded enclosure. The leash can be used to assist controlling the animal being exercised. A problem present with this device is its lack of ergonomic considerations. As an animal pulls vigorously on the leash, the cylindrical design of the handle, combine with the location of the leash, cause the device to pull and twist. In view of the typical strength of an animal, this torque force promotes forearm fatigue and therefore shortens the time an animal will likely be exercised.

Yet other devices provide convenient locations for disposal bag dispensing and storage after their use. An example is shown in U.S. Pat. No. 5,551,569 (Garvin-Mazzarisi), which discloses a bag dispenser and temporary pet waste receptacle. The receptacle, resembling a cat, provides a chamber to store and dispense bags, while a second chamber is offered for the disposal of bagged waste. As most pet owners do not prefer to handle animal waste without an implement of some type, a means to secure a scoop is also provided. This device is stationary, and therefore does not provide a pet owner with a means to help exercise the animal.

Aside from collecting and disposing waste material, facilitating efficient and proper decomposition of waste is also desirable. The more quickly waste material is broken down, the more readily it may be used as fertilizer. Some devices provide means to contain waste and promote its accelerated decomposition. An example of a disposable waste bag pack is disclosed in United States Patent Publication No. 2001/0034904 (Phillips et al.). The pack has a waste-containing bag as well as waste-treating chemicals. The chemicals include gelling agents, odor neutralizers, and decay catalysts. In this instance, the pack is designed to fit over a toilet seat, specifically a toilet seat for a portable toilet, e.g., a camping toilet.

As can be derived from the variety of devices directed at individual aspects of the animal waste disposal process, many means have been contemplated to accomplish the desired end, i.e., sanitary and efficient decomposition of waste, without sacrificing the likelihood that an animal receives exercise. Heretofore, these tasks can only be accomplished by practicing several methods and devices. Thus, there has been a longfelt need for an ergonomically shaped animal waste collection and disposal apparatus, having means to effectively contain and efficiently decompose animal waste.

BRIEF SUMMARY OF THE INVENTION

The present invention broadly includes an animal waste collection apparatus having a portable carrying device with a plurality of separately sealable compartments, and including an integral ergonomic handle and integral means to mount a leash.

A general object of the invention is to provide a releasably securable leash to which an animal may be secured.

Another object of the invention is to provide an illumination source proximate to the leash.

A further object of the invention is to provide an indicia of use, for example a molded plastic carrying device resembling a dog.

Yet another object of the invention is to provide an animal waste collection tongs device including a pair of tongs members and having an integral protective shield.

An additional object of the invention is to provide an animal waste disposal device including a biodegradable bag and a catalyst integral to the bag.

Another object of the invention is to provide a cornhusk catalyst material to accelerate the decomposition of waste material.

A further object of the invention is to provide a waste disposal container having a lid that includes an animal head figurine, thus indicating the appropriate waste material for disposal therein.

These and other objects, features, and advantages of the present invention will become readily apparent to one having ordinary skill in the art upon reading the detailed description of the invention in view of the drawings and appended claims.

BRIEF DESCRIPTION OF THE DRAWINGS

The nature and mode of operation of the present invention will now be more fully described in the following detailed description of the invention taken with the accompanying drawing figures, in which:

FIG. 1 illustrates present invention;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the preferred embodiment.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
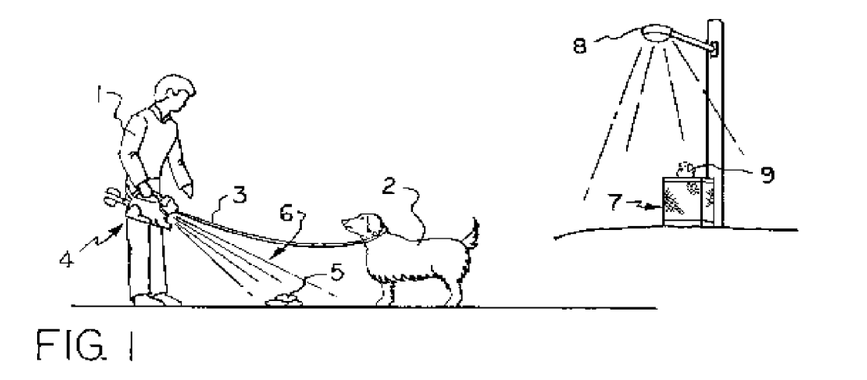

Adverting now to the figures, FIG. 1 shows an embodiment of the present invention being used while exercising a dog. Pet owner 1 controls dog 2 by releasably attaching the distal end of leash 3 to dog 2, while releasably attaching the proximal end of leash 3 to portable carrying housing 4. Animal waste 5 is produced by dog 2. In this embodiment, pet owner 1 is exercising dog 2 at night, therefore light beam 6 is used to illuminate animal waste 5, such that pet owner 1 may properly collect the waste material. Upon collecting waste material 5, pet owner 1 may dispose of the waste in waste disposal container 7. As use of the embodiment shown in this figure takes place at night, waste disposal container 7 is illuminated by overhead light 8. However, light 8 is not particularly germane to the invention and is only included in this embodiment to depict how waste disposal container 7 may be viewed at night under illumination. Lastly, waste disposal container 7 includes indicia relating the type of waste materials that are appropriate for deposit therein by including animal head figurine 9 on the lid of container 7. Although, animal head figurine 9 is shown as a dog's head in this embodiment, it should be readily apparent to one skilled the art that other shapes, configurations and animals, e.g., a cat's head, are possible for figurine 9 and such modifications are within the scope of the invention as claimed.

Figures 2, 4:
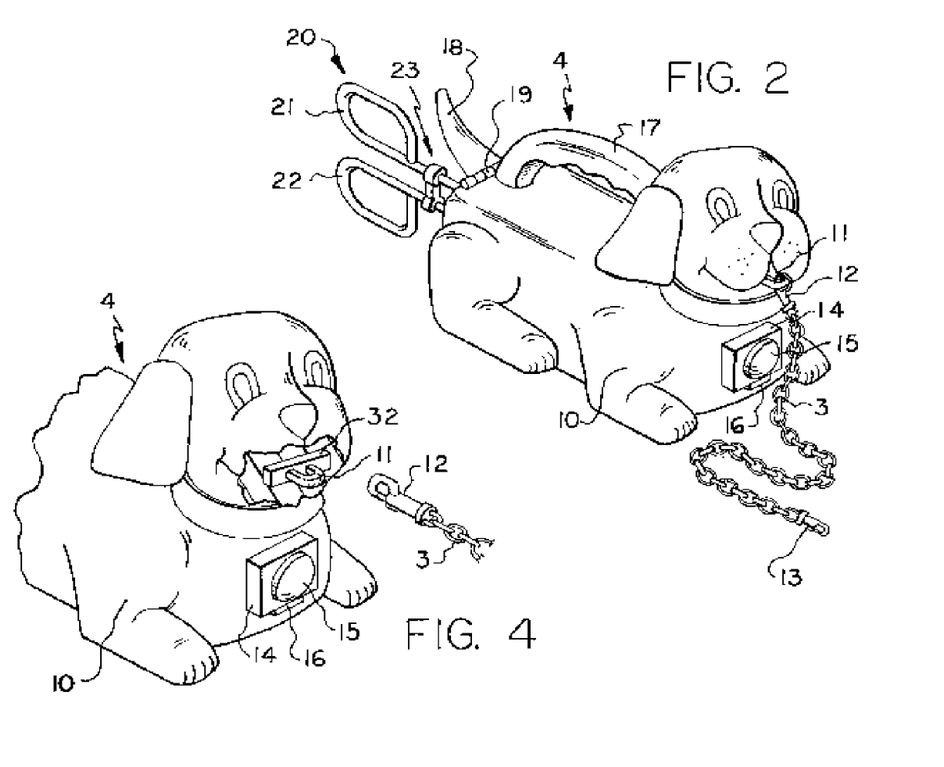
FIG. 2 is a perspective view of an animal waste collection apparatus of the present invention.
FIG. 4 is a perspective view of the present invention shown in FIG. 2 having a breakaway to show a reinforcement bar.

FIG. 2 is a perspective view of an animal waste collection apparatus of the present invention. In this embodiment, portable carrying housing 4 is molded plastic body 10, which resembles a dog. As one of ordinary skill in the art is aware, both the material of construction and the animal shape of body 10 may take other forms. It is within the scope of the invention as claimed that the system may be constructed from other materials, e.g., fabric or metal, and may resemble other animals, e.g., a cat or potbelly pig. Leash coupling eyelet 11, located within the mouth region of body 10, is operatively arranged to have a leash releasably secured therein. Leash 3, having first and second bolt snaps 12 and 13, respectively, is releasably secured to body 10 via coupling eyelet 11. Although bolt snaps 12 and 13 are shown in this embodiment, other coupling means, e.g., snap hook, are within the metes and bounds of the invention as claimed. Light source 14, proximate coupling eyelet 11, is also integral to body 10. Light source 14 includes lens 15, which directs light beam 6 (see FIG. 1) away from body 10, while switch 16 is provided to toggle light source 14 on and off. As shown in FIG. 1, light source 14 may be used to illuminate animal waste 5 while it is collected, or merely provide light to illuminate the area where pet owner 1 will walk. Handle 17 permits pet owner 1 conveniently grip and carry portable carrying housing 4. Handle 17 is ergonomically shaped such that fatigue imparted on pet owner 1 when using portable carrying housing 4 is minimized. The combination of the shape and size of handle 17, and its position with respect to eyelet 11 maximizes the ability of pet owner 1 to resist the pulling force imparted by dog 2, thereby minimizing fatigue experienced by pet owner 1. In this embodiment, handle 17 is fixedly secured at both ends to body 10, however other configurations are also possible, e.g., fixedly secured at only one end. The animal shape of body 10 is further complimented by animal tail 18. Tail 18 is fixedly secured to hinge 19, thereby permitting rotation of tail 18. The functionality of tail 18 is described in greater detail infra. Lastly, animal waste collection tongs device 20 is located within a separate sealable compartment (see FIG. 11) at the end distal to the head of body 10. Waste collection tongs device 20 includes first and second tongs members 21 and 22, respectively, and releasably securable locking mechanism 23. Tongs device 20 is also described in detail infra.

Figure 3:
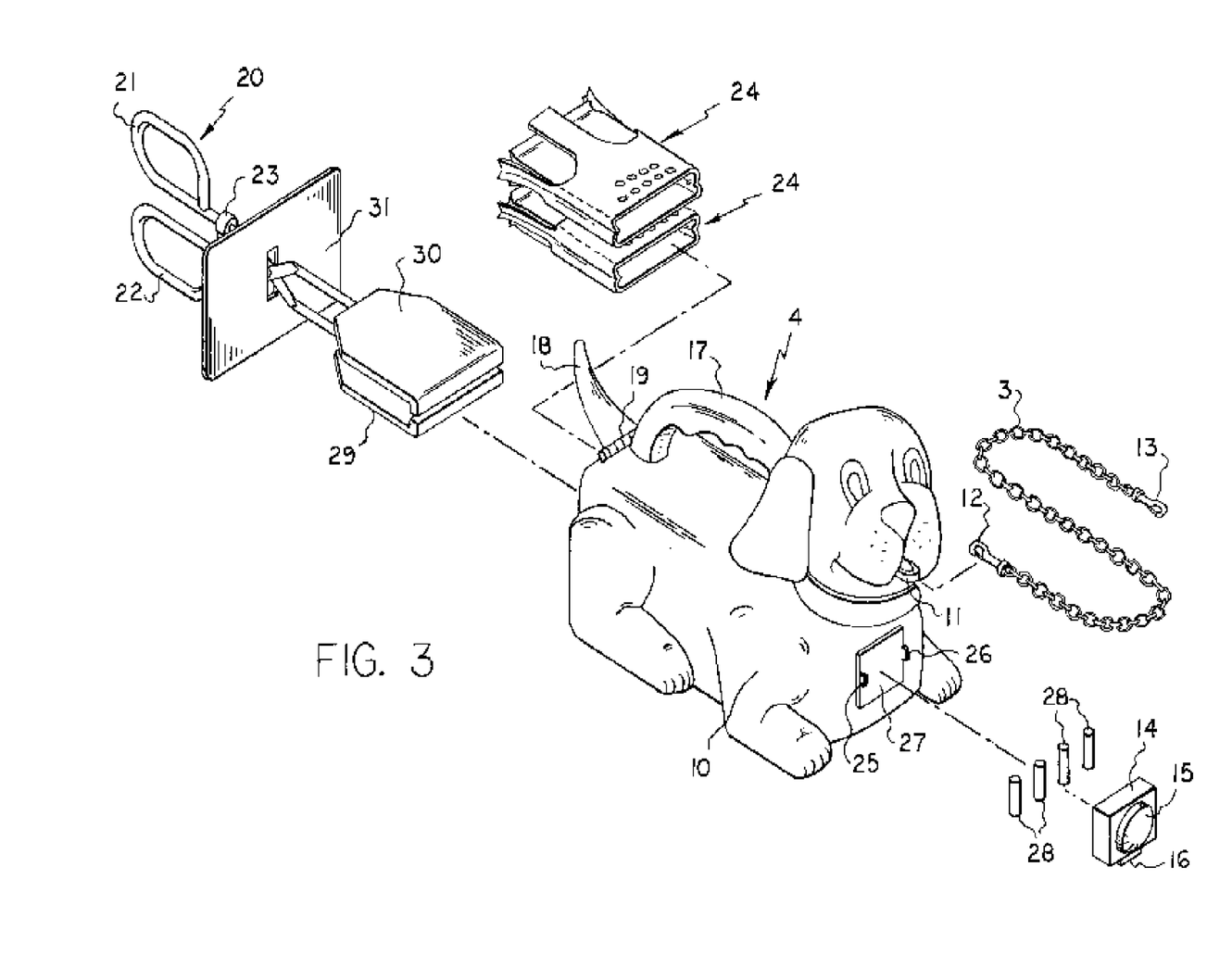
FIG. 3 is an exploded view of the present invention shown in FIG. 2.

FIG. 3 is an exploded view of the present invention animal waste collection apparatus shown in FIG. 2. This embodiment shows additional details and features of light source 14, tongs device 20 and animal waste disposal device 24. Light source 14 is releasably secured to body 10 using first and second clip 25 and 26, respectively, of back plate 27. In this embodiment, four AA-size batteries 28 power light source 14. One of ordinary skill in the art will recognize that many other options are available to power light source 14, e.g., two C-size batteries, and therefore the specific type of battery is not germane to the invention. As briefly described above, tail 18 is fixedly secured to hinge 19, thereby permitting tail 18 to partially rotate about the axis of hinge 19. By partially rotating tail 18, a second separate sealable compartment is opened (see FIG. 11) permitting storage of and access to animal waste disposal device 24. A plurality of disposal device 24 are shown in this embodiment, however a single disposal device 24 may also be stored or used. Lastly, additional features of animal waste collection tongs device 20 are shown in this figure. First and second tongs members 21 and 22, respectively, are complimentary to each other. As such, they share similar features. Both tongs members 21 and 22 include first and second blade 29 and 30, respectively. First and second blade 21 and 22, respectively, are operatively arranged for use with animal waste disposal device 24, and that arrangement is further described in view of FIG. 10 infra. As described supra, collecting animal waste for disposal typically is an undesirable task. The task becomes even less desirable if there is a possibility of coming in contact with the animal waste. Therefore, animal waste collection tongs device 20 includes protective shield 31 that provides a separation between the hand of pet owner 1 (not shown) and the animal waste being collected (see FIGS. 13 and 14).

FIG. 4 is another perspective view of the present invention similar to the embodiment shown in FIG. 2, however in this instance the portable carrying housing is shown having a breakaway to reveal a reinforcement bar. When exercising an animal, e.g., a dog, using portable carrying housing 4, the animal is releasably secured to housing 4 using leash 3 (see FIG. 1). Depending on the size and strength of the animal, a significant pulling force may be imparted through leash 3 to leash coupling eyelet 11. To prevent the animal from escaping, leash coupling eyelet 11 must be fixedly secured within molded plastic body 10. In addition to being fixedly secured, coupling eyelet 11 requires reinforcement, thereby increasing the maximum pulling force coupling eyelet 11 can withstand. Additional strength is provided by reinforcement bar 32 to which coupling eyelet 11 is attached. The means of attaching coupling eyelet 11 to reinforcement bar 32 may be accomplished by one of many means readily apparent to one skilled in the art to which the subject invention belongs, e.g., welding, brazing or bonding. In this embodiment, molded body 10 is formed around reinforcement bar 32 thereby retaining coupling eyelet 11 within the mouth region of molded body 10.

Figures 5, 6A, 6B, 7, 8:
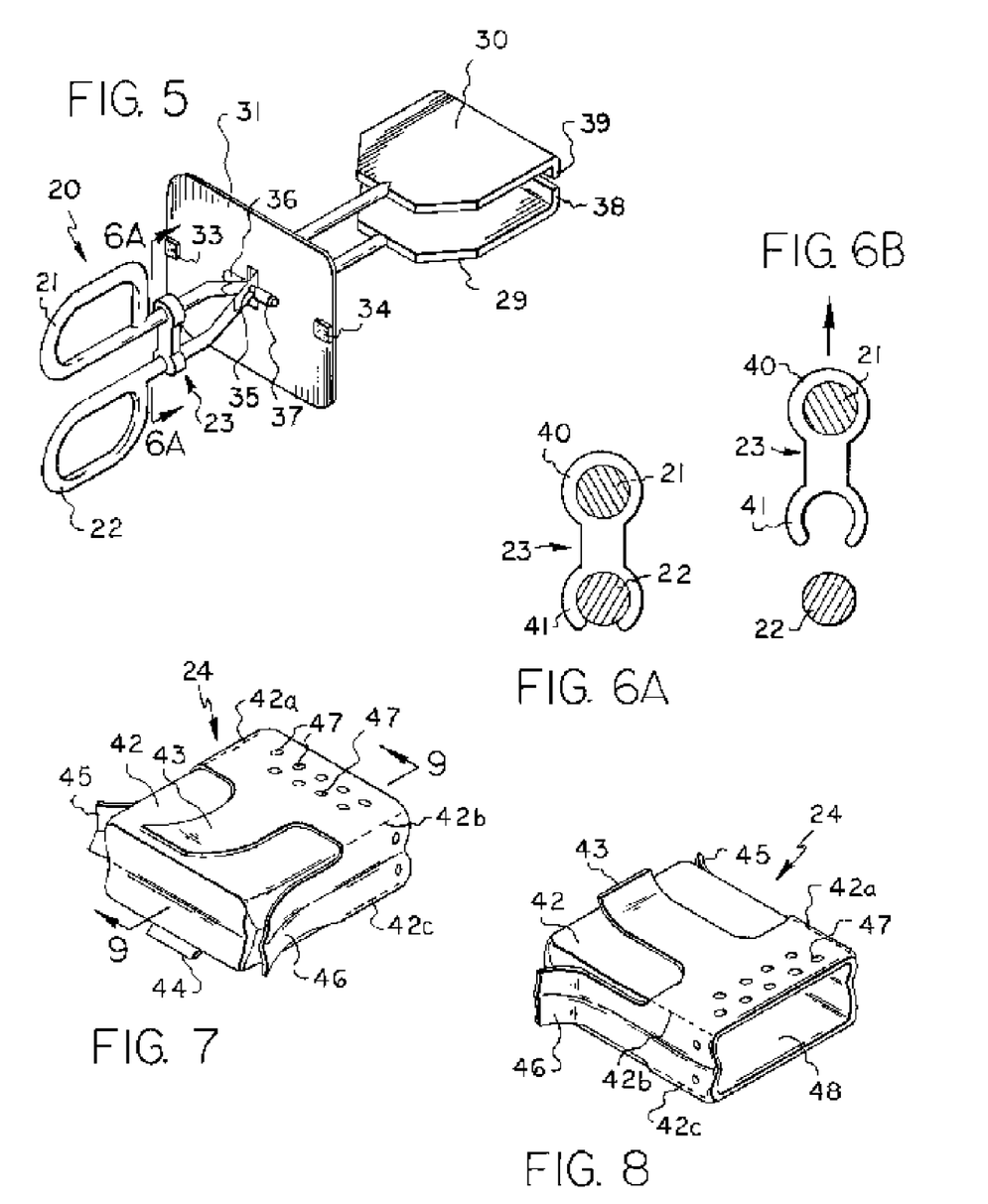
FIG. 5 is a perspective view of the animal waste collection tongs device shown in FIG. 3.
FIG. 6A is a cross-sectional view of an embodiment of an engaged locking mechanism for the animal waste collection tongs device shown in FIG. 5, taken generally along line 6A-6A of FIG. 5.
FIG. 6B is a cross-sectional view of an embodiment of a released locking mechanism for the animal waste collection tongs device shown in FIG. 5, taken generally along line 6A-6A of FIG. 5.
FIG. 7 is a perspective view of an embodiment of an animal waste disposal device of the present invention.
FIG. 8 is another perspective view of the embodiment of the animal waste disposal device shown in FIG. 7.

FIG. 5 is a perspective view of animal waste collection tongs device 20 shown in FIG. 3. Protective shield 31 includes first and second shield tabs 33 and 34, respectively, which are used when retaining tongs device 20 within portable carrying housing 4. The method of retaining tongs device 20 is described infra. First and second tongs member 21 and 22, respectively, pivot in relation to each other about pin 35. In the embodiment shown, pin 35 extends through both tongs members 21 and 22 and subsequently through first and second protective shield features 36 and 37, respectively. However, it should be readily apparent to one skilled in the art that other pivot means and configuration are possible, and such modifications are within the spirit and scope of the invention as claimed. For example, first and second tongs members 21 and 22, respectively, may be individually attached to first and second protective shield features 36 and 37, respectively. However in the aforementioned embodiment, two pins are required, a first pin operatively arranged within first protective shield feature 36 and first tongs member 21 and a second pin operatively arranged within second protective shield feature 37 and second tongs member 22. Lastly, first and second lips 38 and 39, respectively, are integral to first and second blades 29 and 30, respectively. Lips 38 and 39 are provided to aid in the retention of waste within animal waste collection device 24 (not shown) after collection. This function is described in view of FIG. 14 infra.

Figures 12, 13, 14, 15:
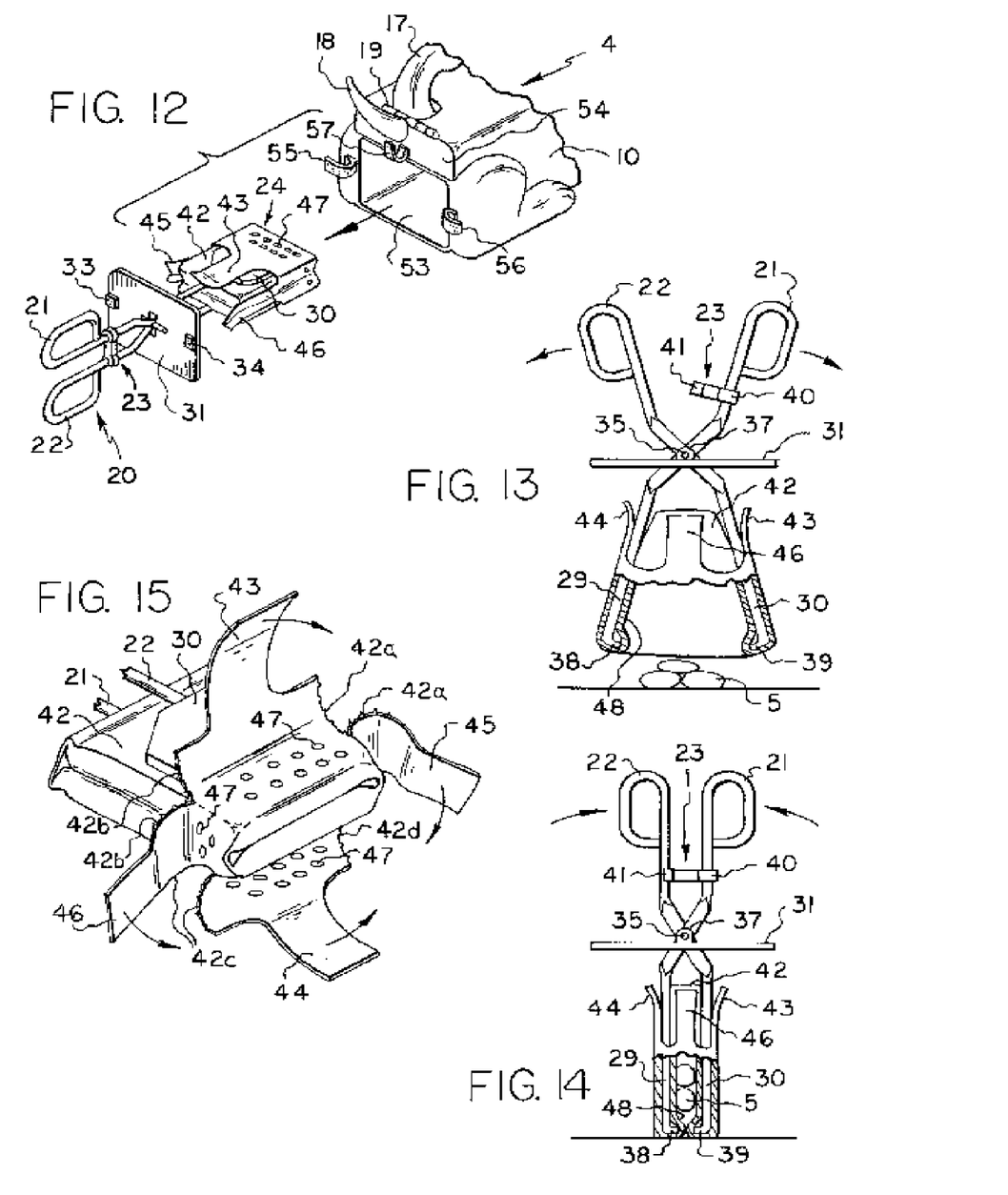
FIG. 12 is a perspective view showing the removal of the animal waste collection tongs device and waste disposal device from the portable carrying housing of the present invention.
FIG. 13 is a side plan view of the animal waste collection tongs device and waste disposal device of the present invention shown open and collecting animal waste.
FIG. 14 is another side plan view of the animal waste collection tongs device and waste disposal device of the present invention shown closed and collecting animal waste.
FIG. 15 is a perspective view of an embodiment of the waste disposal device showing its ability to seal while located on the animal waste collection tongs device.
Figures 16, 17, 18:
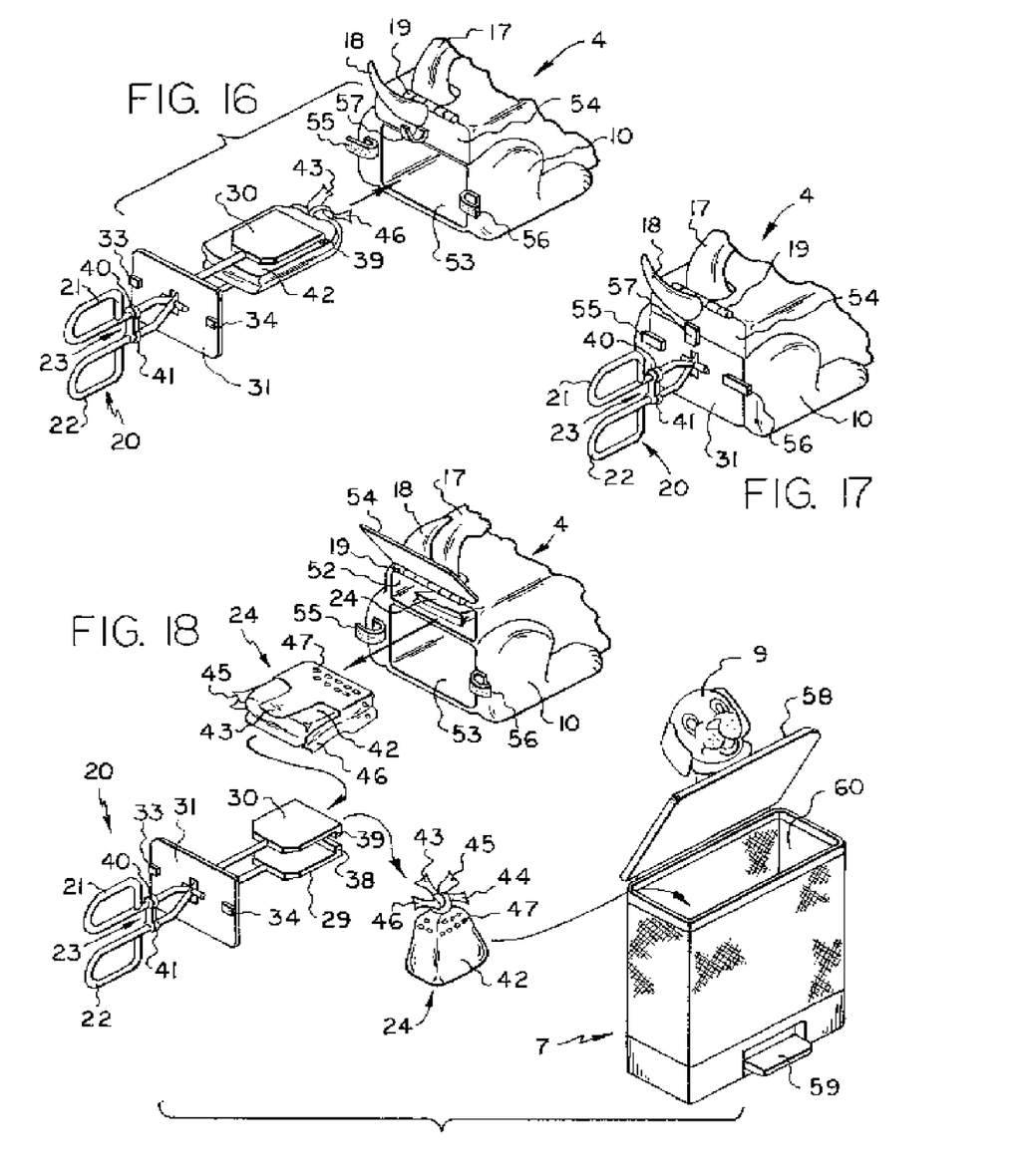
FIG. 16 is a perspective view showing the repositioning of the animal waste collection tongs device and sealed waste disposal device within the portable carrying housing of the present invention.
FIG. 17 is a perspective view showing tabs holding the animal waste collection tongs device within the portable carrying housing of the present invention.
FIG. 18 is a perspective view showing an embodiment of the proper disposal of the sealed waste disposal device and an embodiment of the reinstallation of an unused waste disposal device on the animal waste collection tongs device; and, FIG. 19 is a perspective view of an embodiment of a sealed waste disposal device having a breakaway showing means of accelerating the decomposition of the contained animal waste.

As is more readily understood in view of FIGS. 14, 15 and 16, animal waste collection tongs device 20 includes locking mechanism 23 to assist retaining waste material within animal waste disposal device 24. Hence, FIGS. 6A and 6B are provided to show an embodiment of a locking mechanism. FIG. 6A is a cross-sectional view of an engaged locking mechanism for tongs device 20 shown in FIG. 5, taken generally along line 6A-6A of FIG. 5. In this embodiment, locking mechanism 23 is fixedly secured by continuous loop 40 to first tongs member 21 and releasably secured by clip 41 to second tongs member 22. Although the structure of locking mechanism 23 includes continuous loop 40 and clip 41, it should be readily apparent to one skilled in the art that other shapes and configurations are possible for loop 40 and clip 41, and such modifications are within the metes and bounds of the invention as claimed.

FIG. 6B is a cross-sectional view of a released locking mechanism for animal waste collection tongs device 20 shown in FIG. 5, taken generally along line 6A-6A of FIG. 5. This embodiment shows locking mechanism 23 in a released state. Continuous loop 40 remains fixedly secured to first tongs member 21, while clip 41 is detached from second tongs member 22. By releasing locking mechanism 23 from second tongs member 22, tongs device 20 may be used to collect animal waste. The use of the aforementioned locking and unlocking is fully described in view of FIGS. 13 and 14 below.

FIG. 7 is a perspective view of an embodiment of an animal waste disposal device of the present invention. Animal waste disposal device 24 includes external bag wall 42 and top, bottom, first side and second side tabs 43, 44, 45 and 46, respectively. The tabs are separated in-part by partially weakened material, e.g., perforation, along the line segments between the tabs. Line segment 42a separates tab 43 from tab 45, line segment 42b separates tab 43 from tab 46, line segment 42c separates tab 46 from tab 44, and line segment 42d (not shown) separates tab 44 from tab 45. Tabs 43, 44, 45 and 46 further include a plurality of aeration holes 47. The method of using disposal device 24 is fully described in view of FIGS.

Figure 19:
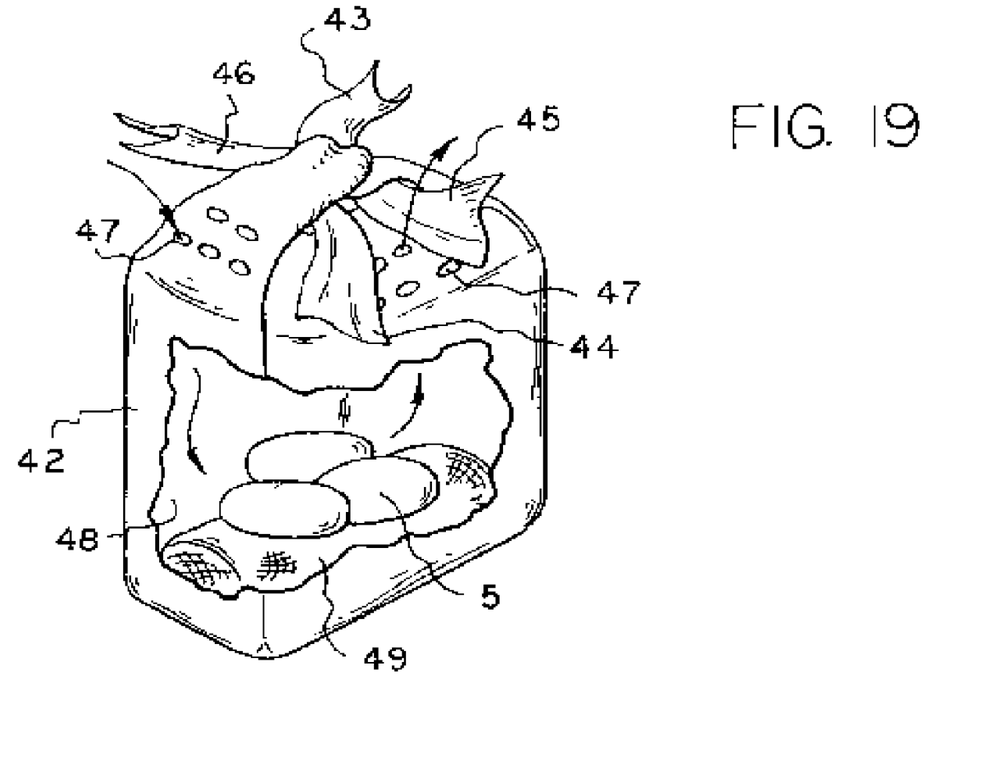

13 through 19 infra. Because it is preferred that animal waste decompose as readily as possible, in a preferred embodiment, disposal device 24 is constructed from a biodegradable material, e.g., natural paper.

FIG. 8 is another perspective view of the embodiment of waste disposal device 24 shown in FIG. 7. In this view, internal bag wall 48 is shown. Animal waste is contained during collection within the area formed by internal bag wall 48, as described below. In this embodiment, external and internal bag walls 42 and 48, respectively, are a single material, and as such both comprise biodegradable materials. Although the structure of external and internal bag walls 42 and 48, respectively, includes a single continuous biodegradable material, it should be readily apparent to one skilled in the art that other biodegradable material combinations and configurations are possible for walls 42 and 48, and such modifications are within the spirit and scope of the invention as claimed. For example external and internal bag walls 42 and 48, respectively, may be constructed from two different types of material.

Figure 9:
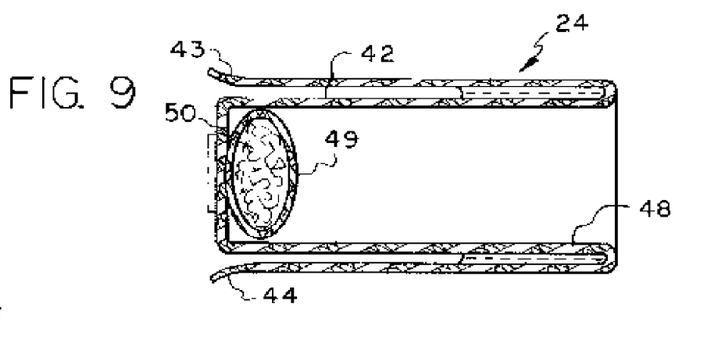
FIG. 9 is a cross-sectional view of an embodiment of the animal waste disposal device shown in FIG. 7, taken generally along line 9-9 of FIG. 7.

FIG. 9 is a cross-sectional view of an embodiment of waste disposal device 24 shown in FIG. 7, taken generally along line 9-9 of FIG. 7. In this embodiment, the internal contents of animal waste disposal device 24 are shown. As previously mentioned, it is desirable to accelerate the decomposition of animal waste material. Therefore, in addition to aeration holes 47 (see FIG. 7), disposal device 24 includes catalyst pouch 49 that is integral to internal bag wall 48 and contains catalyst 50 therein. In a preferred embodiment, catalyst pouch 49, similar to animal waste disposal device 24, is manufactured from a biodegradable material. However, in this instance, it is more desirable to quickly expose the collected animal waste (not shown) with catalyst 50. Hence, in this embodiment, catalyst pouch 49 is constructed from a water soluble material, however pouch 49 may be constructed from any biodegradable material. Shortly after contacting the animal waste, pouch 49 will begin to breakdown, thereby exposing catalyst 50 to the waste. And subsequently, the catalyst accelerates the decomposition of the animal waste.

Figure 10:
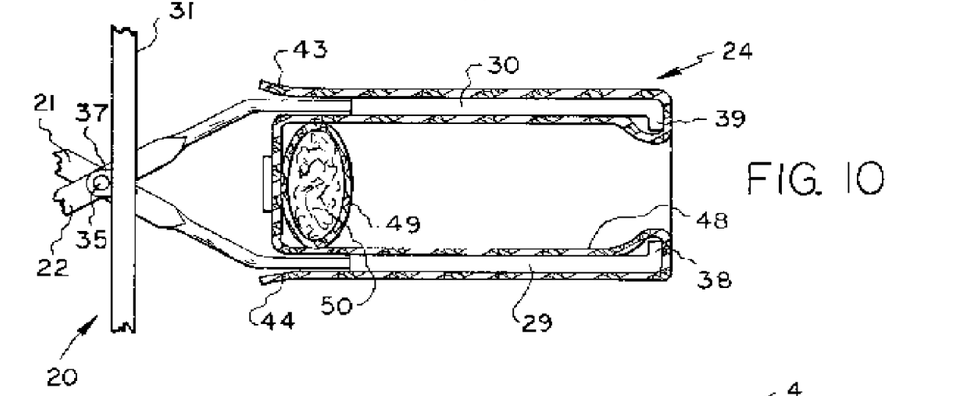
FIG. 10 is a cross-sectional view of the embodiment of the animal waste disposal device shown in FIG. 9 having the animal waste collection tongs device operatively arranged within the disposal device, taken generally along line 9-9 of FIG. 7.

FIG. 10 is a cross-sectional view of the embodiment of waste disposal device 24 shown in FIG. 9 having animal waste collection tongs device 20 operatively arranged within disposal device 24, taken generally along line 9-9 of FIG. 7. In this embodiment, tongs device 20 is operatively arranged within animal waste disposal device 24. First blade 29 is positioned within the pocket formed by external bag wall 42 and bottom tab 44, while second blade 30 is positioned within the pocket created between external bag wall 42 and top tab 43, while. Also shown in the embodiment in this figure is second protective shield feature 37 and pin 35. Pin 35 forms the pivot point between first and second tongs members 21 and 22, respectively. In a preferred embodiment, pin 35 has a length sufficient to extend from first protective shield feature 36 (not shown), through first and second tongs members 21 and 22, respectively, and continue through second protective shield feature 37. As described, protective shield 31 maintains its location with respect to tongs members 21 and 22, while permitting some rotation about pin 35. As mentioned above, although the structure of pin 35 and protective shield features 36 and 37 includes a single continuous pin, it should be readily apparent to one skilled in the art that other structures and configurations are possible for pin 35 and features 36 and 37, e.g., the aforementioned dual pin design, and such modifications are within the spirit and scope of the invention as claimed.

Figure 11:
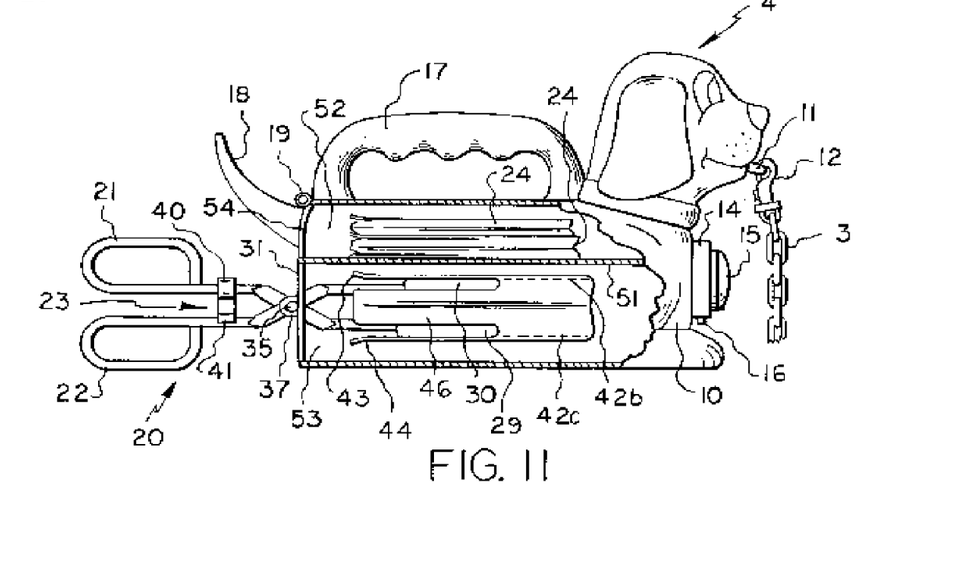
FIG. 11 is a side plan view of the animal waste collection apparatus of the present invention with a breakaway showing the animal waste collection tongs device and a storage compartment for the waste disposal devices.

FIG. 11 is a side plan view of the animal waste collection apparatus of the present invention with a breakaway showing the animal waste collection device, and a storage compartment for the waste disposal device. Wall 51 separates upper storage compartment 52 from lower storage compartment 53. While animal waste collection tongs device 20 is located within portable carrying housing 4, protective shield 31 forms the final wall of lower storage compartment 53, thereby sealing in any undesirable smells produced by collected waste material. As described above, tail 18 is fixedly secured to hinge 19. Additionally, upper storage wall 54 is fixedly secured to hinge 19. The nature and function of wall 54 is fully described in view of FIG. 18 below.

FIG. 12 is a perspective view showing the removal of animal waste collection tongs device 20 and animal waste disposal device 24 from portable carrying housing 4 of the present invention. Tongs device 20 is removed from molded body 10, i.e., from second storage compartment 53, by releasing first and second body tabs 55 and 56, respectively, from first and second shield tabs 33 and 34, respectively. After releasing body tabs 55 and 56 from shield tabs 33 and 34, respectively, tongs device 20 is free to be removed and used. The closed position of upper storage wall 54, whereby upper storage compartment 52 is sealed, is maintained by upper storage wall tab 57. When a user desires to access upper storage compartment 52, for example to obtain an unused animal waste disposal device 24 (see FIG. 18), they must first release upper storage wall tab 57. Subsequently, tail 18 and upper storage wall 54 are permitted to pivot about the axis of hinge 19, thereby providing access to upper storage compartment 52.

FIG. 13 is a side plan view of animal waste collection tongs device 20 and animal waste disposal device 24 of the present invention shown in an open position and collecting animal waste 5. First and second tongs members 21 and 22, respectively, pivot about the axis of pin 35. In the open position, locking mechanism 23 remains fixedly secured to first tongs member 21 via continuous loop 40. Contrarily, clip 41 is detached from second tongs member 22. As shown in this figure, protective shield 31 provides a barrier between an operator of tongs device 20 and animal waste 5. Hence, protective shield 31 prevents any contact of waste material 5 by the operator (not shown) as well as provides the aforementioned means to seal lower storage compartment 53. Animal waste disposal device 24 is expanded slightly by the operation of waste collection device 20. First and second tongs members 21 and 22, respectively, and consequently first and second blades 29 and 30, respectively, impart an expanding force on waste disposal device 24 when waste collection tongs device 20 is opened, as shown in the figure. Thus, animal waste 5 can be collected within waste disposal device 24, through the enlarged opening created by the previously mentioned expanding force.

FIG. 14 is another side plan view of animal waste collection tongs device 20 and animal waste disposal device 24 of the present invention shown in a closed position and collecting animal waste 5. In this embodiment, tongs device 20 is in a closed position, hence locking mechanism 23 remains fixedly secured to first tongs member 21 via continuous loop 40 and clip 41 is attached to second tongs member 22. In this configuration, first and second lips 38 and 39, respectively, in combination with internal bag wall 48, form a seal, through which animal waste 5 is prevented from passing.

After animal waste 5 has been collected, animal waste disposal device 24 may be further sealed. FIG. 15 is a perspective view of an embodiment of waste disposal device 24 depicting its ability to be sealed while located on animal waste collection tongs device 20. Once animal waste 5 is collected and held within waste disposal device 24, tabs 43, 44, 45 and 46 are separated at line segments 42a, 42b, 42c and 42d and thereafter used to seal disposal device 24. Hence, as tabs 43, 44, 45 and 46 are pulled away from protective shield 31 (not shown), the tabs separate from each other, thereby providing convenient tie straps to seal animal waste disposal device 24 (see FIG. 19).

FIG. 16 is a perspective view showing the replacement of animal waste collection tongs device 20 and sealed waste disposal device 24 within portable carrying housing 4 of the present invention. After waste disposal device 24 has been sealed as described above, it is desirable to store waste disposal device 24 until an appropriate disposal location is found. Because it may be inconvenient to carry tongs device 20 once waste material has been collected, lower storage compartment 53 within portable carrying housing 4 is provided. Lower storage compartment 53 is operatively arranged to permit the storage of both waste collection tongs device 20 and waste disposal device 24. Hence, as shown in the figure, tongs device 20, holding waste disposal device 24, is returned to lower storage compartment 53.

FIG. 17 is a perspective view showing tabs holding animal waste collection tongs device 20 within portable carrying housing 4 of the present invention. Once tongs device 20 is restored to its original location within lower storage compartment 53, first and second body tabs 55 and 56, respectively, are releasably secured to tabs 33 and 34 (not shown) located on protective shield 31. In this embodiment, tabs 33 and 34 are secured to tabs 55 and 56 by similar means as brand hook and loop fastener, i.e., two complimentary parts which adhere to each other when pressed together. Although in this embodiment the structure of tabs 33, 34, 55 and 56 includes Velrco®-like adhesion means, it should be readily apparent to one skilled in the art that other structures and configurations are possible for tabs 33, 34, 55 and 56, e.g., conventional snaps, and such modifications are within the spirit and scope of the invention as claimed. While tongs device 20 is in its stored located, the waste material and any unpleasant odors are contained within portable carrying housing 4, and thus the user is not exposed to such unpleasantries.

FIG. 18 is a perspective view showing an embodiment of a proper disposal of the sealed waste disposal device 24 and an embodiment of the reinstallation of an unused waste disposal device 24 on animal waste collection tongs device 20. Once the user locates a suitable repository for the collected waste, e.g., animal waste disposal container 7, sealed waste disposal device 24 is removed from animal waste collection tongs device 20 and disposed of in disposal container 7. In this embodiment, waste disposal container 7 includes lid 58 having a decorative indicia, animal head figurine 9, which clearly identifies the purpose of disposal container 7. To provide a more sanitary means of opening, disposal container 7 includes foot operated pedal 59. Pedal 59, when actuated by the user's foot (not shown), causes lid 58 to open, thereby allowing the user to deposit animal waste disposal device 24 within disposal container internal compartment 60. Subsequently, the user may desire to replace the used waste disposal device 24 with an unused waste disposal device 24. Thus, the user will release upper storage volume tab 57, which then permits wall 54 to be opened, exposing the unused waste collection device 24 contained within upper storage compartment 52. An unused disposal device 24 may then be placed on animal waste collection tongs device 20 as described supra.

FIG. 19 is a perspective view of an embodiment of a sealed waste disposal device 24 having a breakaway showing means of accelerating the decomposition of the contained animal waste 5. Within waste disposal device 24, animal waste 5 rests on catalyst pouch 49. As pouch 49 breaks down, described supra, animal waste 5 is exposed to catalyst 50 (no shown), thereby accelerating the decomposition of waste 5. To further accelerate the decomposition of waste 5, a well aerated environment is provided. Aeration holes 47 provide waste disposal device 24 with an entrance and exit for air. The decomposition rate will increase due in part to the increased aeration provided by aeration holes 47 and the contact with catalyst 50 (not shown). Subsequently, external and internal bag walls 42 and 48, respectively, biodegrade, thereby permitting waste material 5 to fully decompose.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed:

1. An animal waste collection apparatus comprising:
   a portable carrying housing having a plurality of separate storage compartments;
   said plurality of separate storage compartments comprises a first storage compartment and a second storage compartment;
   a hinged door arranged to seal said first storage compartment;
   an ergonomic handle integral to said portable carrying housing;
   means to mount a leash integral to said portable carrying housing; and,
   a tongs pivotally engaged to a shield, wherein said shield and tongs are releasably securable within said second storage compartment and said shield arranged to seal said second storage compartment.

2. The animal waste collection apparatus of claim 1 further comprising a releasably securable leash.

3. The animal waste collection apparatus of claim 1 further comprising an illumination source proximate to said means to mount a leash.

4. The animal waste collection apparatus of claim 1 wherein said portable carrying housing resembles a dog.

5. The animal waste collection apparatus of claim 1 wherein said tongs further comprise:
   a first tongs member;
   a second tongs member; and,
   a pin, wherein said first and second tongs members pivotally engage said pin.

6. The animal waste collection apparatus of claim 5 wherein said pin extends perpendicularly outwardly from said first and second tongs members, said shield further comprises first and second features disposed on opposite sides of an aperture, said first and second tongs members received in said aperture, said pin received in said first and second features and pivotally engages said first and second features.

7. The animal waste collection apparatus of claim 5 wherein said first and second tongs members further comprise first and second protrusions, respectively, said shield further comprises third and fourth features disposed on opposite sides of an aperture, said first and second tongs members received in said aperture, said first and second protrusions received in said third and fourth features, respectively, and pivotally engage said third and fourth features, respectively.

8. The animal waste collection apparatus of claim 5 wherein said tongs further comprise means to releasably secure said first tongs member to said second tongs member.

9. The animal waste collection apparatus of claim 1 further comprising at least one animal waste disposal device, wherein said at least one animal waste disposal device comprises a biodegradable bag and a catalyst integral to said biodegradable bag.

10. The animal waste collection apparatus of claim 9 wherein said catalyst comprises a cornhusk pouch.

11. The animal waste collection apparatus of claim 1 further comprising a waste disposal container, wherein said container comprises a lid having an animal head figurine located thereon.

12. An animal waste collection apparatus comprising:
- a molded plastic portable carrying housing having a plurality of separate storage compartments;
- said plurality of separate storage compartments comprises a first storage compartment and a second storage compartment;
- a hinged door arranged to seal said first storage compartment;
- an ergonomic handle integral to said portable carrying housing;
- means to mount a leash integral to said portable carrying housing;
- a releasably securable leash, wherein said leash is releasably secured at a first end to said means to mount a leash and releasably secured at a second end to an animal; and,
- a tongs pivotally engaged to a shield, wherein said shield and tongs are releasably securable within said second storage compartment and said shield arranged to seal said second storage compartment.

13. An animal waste collection apparatus comprising:
- a molded plastic portable carrying housing having a plurality of separate storage compartments;
- said plurality of separate storage compartments comprises a first storage compartment and a second storage compartment;
- a hinged door arranged to seal said first storage compartment;
- an ergonomic handle integral to said portable carrying housing;
- means to mount a leash integral to said portable carrying housing;
- a releasably securable leash, wherein said leash is releasably secured at a first end to said means to mount a leash and releasably secured at a second end to an animal;
- an illumination source proximate to said means to mount a leash;
- a tongs pivotally engaged to a shield, wherein said shield and tongs are releasably securable within said second storage compartment and said shield arranged to seal said second storage compartment; and,
- at least one animal waste disposal device, wherein said at least one animal waste disposal device comprises a biodegradable bag and a catalyst integral to said biodegradable bag.

* * * * *